J. TANEYHILL.
AIRPLANE.
APPLICATION FILED FEB. 5, 1919.

1,331,402.

Patented Feb. 17, 1920.
2 SHEETS—SHEET 1.

Attest
Charles A. Becker

Inventor
John Taneyhill,
By Rippey Kingsland,
His Attorneys.

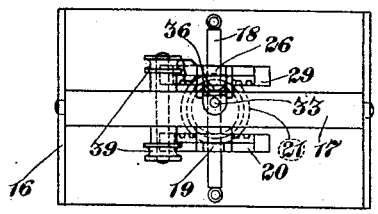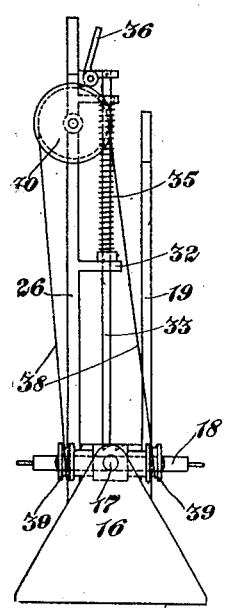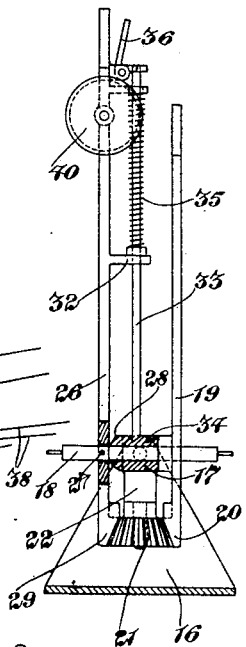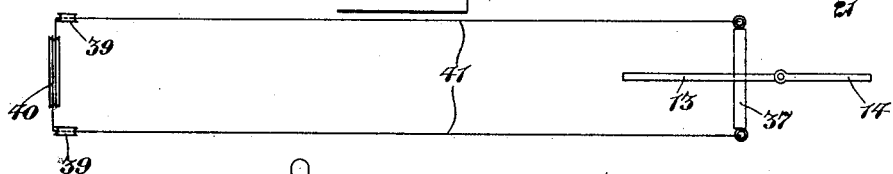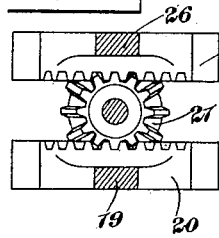

UNITED STATES PATENT OFFICE.

JOHN TANEYHILL, OF ST. LOUIS, MISSOURI.

AIRPLANE.

1,331,402.     Specification of Letters Patent.     Patented Feb. 17, 1920.

Application filed February 5, 1919. Serial No. 275,073.

*To all whom it may concern:*

Be it known that I, JOHN TANEYHILL, a citizen of the United States, residing at the city of St. Louis and State of Missouri, have invented new and useful Airplanes, of which the following is a specification.

This invention relates to airplanes.

An object of the invention is to provide an airplane of novel construction equipped with devices and mechanism for maintaining more accurate and perfect control of the machine during flight and particularly when rising or when passing through air pockets, and the like.

Another object is to provide an airplane having the propeller in front and having a relatively small and short wing at the forward end of the fuselage, and longer and wider wings of larger area at the rear end of the fuselage instead of the reverse construction employed in machines at present in use; and the wings are provided with ailerons for maintaining lateral balance of the machine during flight.

Another object of the invention is to provide an airplane having the wings thereof provided with ailerons for maintaining the lateral balance of the machine during flight, and novel mechanism for manipulating the ailerons.

Other objects will appear from the following description in which reference is made to the drawing illustrating an airplane embodying the principles of my invention, and in which—

Fig. 3 is an enlarged plan view of the lever mechanism controlling the connections for manipulating the ailerons.

Fig. 4 is a rear end elevation thereof.

Fig. 5 is a side elevation thereof showing the levers in different positions.

Fig. 6 is a view partly in section, showing the construction by which one of the levers is held in different adjusted positions.

Fig. 7 is a diagrammatic plan view showing the means by which the rudder is controlled.

Fig. 8 is a view of one of the controlling levers removed from its mountings.

Fig. 9 is an enlarged sectional view showing the construction by which the two levers are simultaneously controlled when either one of the levers is operated.

Figure 1:
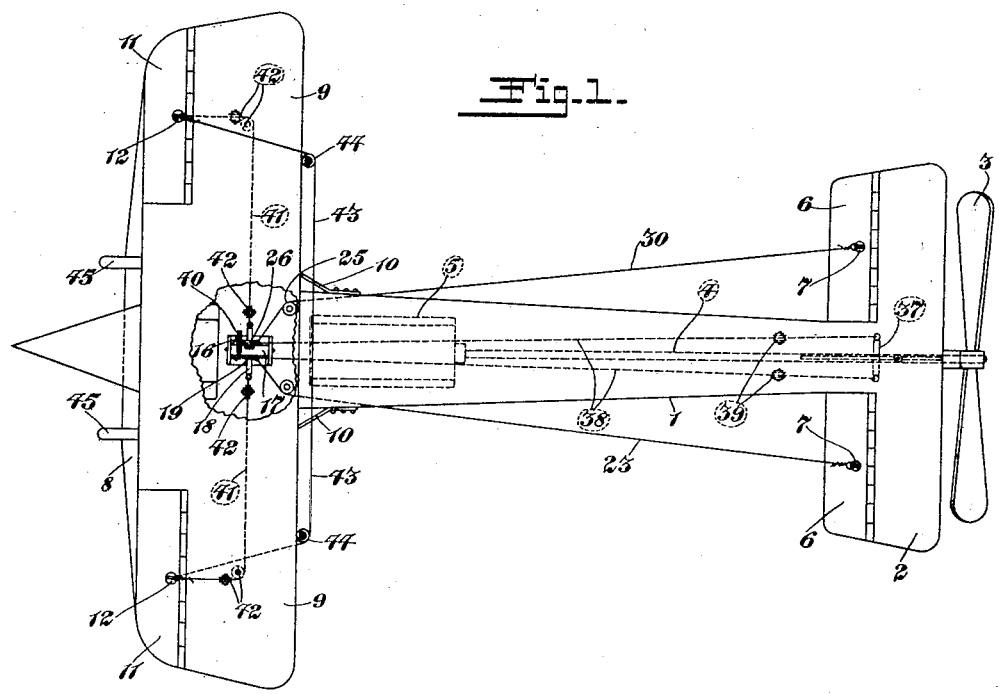
Figure 1 is a plan view of the airplane having a portion of one of the wings thereof broken away to disclose the mechanism for controlling and manipulating the ailerons and the rudder.
Figure 2:
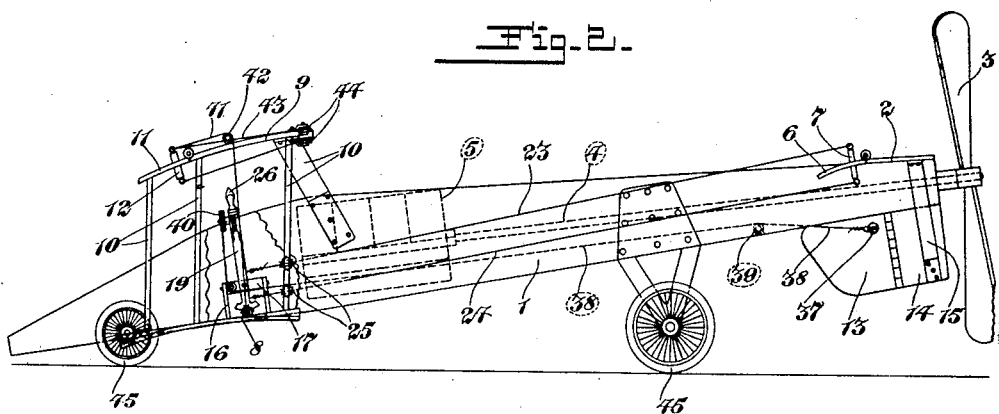
Fig. 2 is a side elevation.

The fuselage or body 1 has at its forward end a wing 2 which, as appears by reference to the drawing, is of relatively short and narrow dimensions and of relatively small surface area as compared with the wings at the rear of the fuselage. The propeller 3 is attached to a shaft 4 journaled in the fuselage and extending from the engine 5 beyond the forward end of the fuselage so that the propellers are appropriately supported in front of the wing 2. At each side of the fuselage an aileron 6 is pivotally supported in connection with the wing 2. A rod or arm 7 extends vertically through and is rigidly connected with each of the ailerons 6.

Near the rear end of the fuselage or body of the airplane is a wing 8 which, as appears by reference to the drawing, is of relatively long and wide dimensions and of relatively large surface area as compared with the wing 2 at the forward end of the fuselage. The wing 8, as shown, is at the lower side of the fuselage. Above the wing 8 a wing 9 of nearly similar dimensions and surface area is supported, being attached to appropriate supporting members 10. The rear portion of the wing 9 near each end thereof pivotally supports an aileron 11, and a rod or arm 12 extends vertically through and is rigidly connected with each of the ailerons 11.

The forward end of the fuselage supports a rudder for controlling the horizontal movements of the airplane in flight. As shown, the rudder includes a wing 13 mounted in a vertical plane and pivotally supported in connection with a thin supporting element 14 rigidly connected with the fuselage by connecting elements 15.

In addition to the above novel features my invention further comprises mechanism for accurately controlling the ailerons to maintain lateral balance of the machine during flight irrespective of air pockets, or eddies, or other conditions of the air through which the machine is flying; and for controlling the rudder in order to steer the machine in a horizontal direction. This mechanism includes connections from the ailerons and from the rudder and levers for manipulating the connections to control said parts.

As shown, a frame 16 is supported by the fuselage above the wing 8 and a member 17 is mounted in said frame and is capable of rocking movements. A rod 18 passes through the member 17 and at one side of the said member 17 supports a lever 19. The lever 19 at its upper end is provided with a handle and at its lower end, below the rod 18, is provided with an arcuate rack 20 which is concentric with the rod 18. The rack 20 meshes with a pinion 21 revolubly supported on a projection 22 extending downwardly from the member 17. A wire 23 has one end connected to the lever 19 above the pivot rod 18 and its opposite end connected to the upper end of the rod or arm 7. A wire 24 has one end connected to the lever 19 below the pivot member 18 and has its opposite end connected to the lower end of the rod or arm 7, both of said wires 23 and 24 passing against pulleys or rollers 25 appropriately supported in the fuselage. It is apparent that as a result of this construction movement of the lever 19 in one direction will raise the rear edge of the aileron 6 and movement of the lever 19 in the opposite direction will lower the rear edge of the aileron 6 with which said lever 19 is connected as described.

On the opposite side of the support 17 the pivot 18 supports a lever 26, the same being pinned to the rod 18 by a pin 27. Thus manipulation of the lever 26 in a forward and rearward direction will rock the rod 18. The lever 26 is capable of being oscillated toward and away from the lever 19, there being a rounded abutment 28 against the inner side of the lever permitting such oscillation. The lower end of the lever 26, below the rod 18, has an arcuate rack 29 which is concentric with the pivot 18 and is normally in mesh with the pinion 21. Thus movement of the lever 19 or the lever 26 in a desired direction will cause movement of the other lever in the opposite direction.

A wire 30 has one end connected to the lever 26 above the pivot and its opposite end connected to the rod or arm 7 of that aileron 6 which is on the opposite side of the fuselage from the aileron with which the lever 19 is connected. A wire 31 has one end connected to the lever 26 below the pivot and its opposite end connected to the lower end of the rod or arm 7 to the upper end of which the wire 30 is connected. Thus movement of the lever 26 in one direction will raise the rear edge of the aileron 6, and movement of the lever 26 in the opposite direction will lower the rear edge of the aileron 6 with which said lever 26 is connected as described.

Because of the gear connection between the levers 19 and 26 the aileron at one side of the fuselage will be lowered when the aileron on the opposite side of the fuselage is raised, and vice versa, and this operation is maintained as long as the two levers 19 and 26 are in mesh with the pinion 21. However, on some occasions it may be desired to operate one aileron without operating the other, or it may be desired to raise or to lower both ailerons concurrently. This may be effected by disconnecting the lever 26 from the pinion 21, leaving the two levers free for independent operation, or concurrent operation as desired.

The lever 26 is normally retained in position to hold the rack 29 in mesh with the pinion 21. The lever 26 supports an arm 32 having a hole therein through which a rod 33 extends. The lower end of the rod 33 engages normally in a recess in the upper side of the support 17, thus latching and retaining the lever 26 in an adjusted position in which the rack 29 meshes with the pinion 21. However, if the upper end of the lever 26 be pushed toward the lever 19, the lower end of the rod 33 leaves the recess in which it is normally seated and engages within another recess 34, thus latching the lever 26 in an adjusted position in which the rack 29 is out of mesh with the pinion 21. This ratchet device, comprising the rod 33, may be controlled in any desired manner as by a spring 35 encircling the rod and actuating it downwardly. The rod may be raised out of engagement with the recesses in the support 17 by a lever device 36 of familiar construction.

The rudder 13 has a rod or arm 37 similar to the rods or arms 7 passing therethrough. A wire 38 has one end connected to one end of the arm 37, the opposite end of said wire being connected to the other end of the rod 37. A wire 38 passes over or against rollers 39 and around a manipulative wheel 40 which in the form shown is supported by the lever 26. Thus, by turning the wheel 40 the rudder 13 may be swung to different adjusted positions in order to control or steer the airplane in its horizontal movements.

The ailerons 11 may also be manipulated by wires 41 extending from the lower ends of the rods or arms 12 to the ends of the rod 18. The wires 41 pass against rollers 42. Thus by rocking the member 17 the wires 41 will be moved as required to raise or to lower the rear edges of the ailerons 11. A wire 43 passing against rollers 44 connects the upper ends of the rods 12, but permits movement thereof as required to manipulate the ailerons.

The machine is provided with an appropriate landing gear comprising wheels 45 which support the propeller and other mechanism out of contact with the ground when the machine lands.

From the foregoing it will be understood that my improved airplane possesses numerous advantages which are the result of the novel construction shown and described. The greater weight is supported adjacent to the large planes, leaving the forward end of the machine relatively light and easy to manipulate.

It is apparent that the specific construction of the manipulating devices and other parts of the invention may be varied without departure from the principle of the invention. Therefore, I do not restrict myself to unessential features of construction or arrangement, but what I claim and desire to secure by Letters Patent, is:—

1. An airplane, comprising a long body, a single wing having a relatively small supporting surface at the forward end of the body, a pair of wings at the rear end of the body one above the other and having supporting surfaces largely in excess of the supporting surface of the wing at the forward end of the body, ailerons in connection with one of said large wings, mechanism for manipulating and controlling said ailerons, a motor supported by the body between said large wings, and a propeller in front of the small wing driven by said motor.

2. An airplane, comprising a long body, a single small wing supported by the body near the forward end thereof, ailerons in connection with said wing, a pair of wings at the rear end of the body at relatively a considerable distance from the small wing, arranged one above the other and having greater length and width and greater supporting surfaces than the wing at the forward end of the body, ailerons in connection with one of said last-named wings, mechanism for manipulating the ailerons on said wings respectively, a motor supported by the body between said large wings, a shaft from said motor extending forwardly beyond the small wing, and a propeller driven by said shaft in front of the small wing.

3. An airplane, comprising a long body, a single small wing supported by the body near the forward end thereof, ailerons in connection with said wing, a pair of wings at the rear end of the body at relatively a considerable distance from the small wing, arranged one above the other and having greater length and width and greater supporting surfaces than the wing at the forward end of the body, ailerons in connection with one of said last-named wings, mechanism for manipulating the ailerons on said wings respectively, a rudder at the forward end of the body vertically below the longitudinal axis of the body for controlling the airplane in its lateral movements, a motor supported by the body between said large wings, a shaft from said motor extending forwardly beyond the small wing, and a propeller driven by said shaft in front of the small wing.

4. An airplane, comprising a long body, a single small wing supported by the body near the forward end thereof, ailerons in connection with said wing, a pair of wings at the rear end of the body at relatively a considerable distance from the small wing, arranged one above the other and having greater length and width and greater supporting surfaces than the wing at the forward end of the body, ailerons in connection with one of said last-named wings, mechanism for manipulating the ailerons on said wings respectively, a landing gear in connection with the body of the airplane, a motor supported by the body between said large wings, a shaft from said motor extending forwardly beyond the small wing, and a propeller driven by said shaft in front of the small wing.

5. An airplane, comprising a long body, a single small wing at the forward end of the body, a pair of large wings at the rear end of the body, a motor between said large wings near the rear end of the body, a propeller at the forward end of the body driven by said motor, a rudder at the forward end and vertically below the longitudinal axis of the body, and means for operating said rudder to control the airplane in its lateral movements.

JOHN TANEYHILL.